United States Patent
Hegg et al.

[11] Patent Number: 5,907,416
[45] Date of Patent: May 25, 1999

[54] WIDE FOV SIMULATOR HEADS-UP DISPLAY WITH SELECTIVE HOLOGRAPHIC REFLECTOR COMBINED

[75] Inventors: Ronald G. Hegg, Vista; Chungte W. Chen, Irvine; John E. Gunther, Torrance, all of Calif.; Dennis D. Hansen, Arlington, Tex.

[73] Assignee: Raytheon Company, Lexington, Mass.

[21] Appl. No.: 08/791,019

[22] Filed: Jan. 27, 1997

[51] Int. Cl.[6] .................. G02B 5/32; G02B 27/10
[52] U.S. Cl. ......................................... 359/14; 359/631
[58] Field of Search .................... 359/14, 13, 631; 434/40, 43

[56] References Cited

U.S. PATENT DOCUMENTS

| | | | |
|---|---|---|---|
| Re. 27,356 | 5/1972 | La Russa | 359/494 |
| 3,549,803 | 12/1970 | Becht et al. | 359/631 |
| 3,589,796 | 6/1971 | Schaefer | 359/631 |
| 3,940,203 | 2/1976 | La Russa | 359/15 |
| 4,457,579 | 7/1984 | Thylen | 359/630 |
| 4,669,810 | 6/1987 | Wood | 359/631 |
| 4,832,247 | 5/1989 | Nanba et al. | 359/15 |
| 5,050,962 | 9/1991 | Monnier et al. | 359/630 |
| 5,408,346 | 4/1995 | Trissel et al. | 359/631 |
| 5,537,253 | 7/1996 | Cox et al. | 359/13 |

FOREIGN PATENT DOCUMENTS

| | | | |
|---|---|---|---|
| 1602373 | 11/1981 | United Kingdom | 359/13 |

*Primary Examiner*—Jon Henry
*Attorney, Agent, or Firm*—Price Gess & Ubell

[57] ABSTRACT

A wide field-of-view simulator heads-up display provides images to a user along an optical axis. A HUD CRT provides images of a predetermined design wavelength, while rear projection screen CRTs provide out-of-window scenery that does not contain the predetermined design wavelength. A curved holographic combiner is mounted on the optical axis with a reflective hologram on a concave surface covered with a urethane overcoat. The convex surface has an anti-reflective coating. A tilted beamsplitter cooperates with a folding mirror in a relay optical system for providing a virtual image of the HUD CRT for reflection from the holographic combiner.

15 Claims, 1 Drawing Sheet

WIDE FOV SIMULATOR HEADS-UP DISPLAY WITH SELECTIVE HOLOGRAPHIC REFLECTOR COMBINED

BACKGROUND OF THE INVENTION

1. Field of the Invention

The present invention is directed to a wide field-of-view (FOV) simulator heads-up display (HUD) and, more particularly, to a low-cost system having a selective holographic reflector combiner with a low-cost relay optical system.

2. Description of Related Art

Holographic information display systems for use in aircraft wherein an image of information can be projected onto a combining glass in the pilot's FOV to permit viewing the information, while continuing to view the outside scene through an aircraft canopy, have been well known. The information to be presented by the HUD includes instrument panel information, flight symbology, sensor video, etc. It has thus become quite common in high performance aircraft to utilize a combiner within the pilot's FOV to permit the pilot to continue viewing the terrain or outside scenery while monitoring the necessary information being generated by the aircraft.

In view of the high cost of operating such aircraft and the requirements for the pilots to have high proficiency, there has developed a need to use simulators for the training of pilots. These simulators seek to emulate the environment of the cockpit and include the HUDs that the pilot will experience in actual flight. Usually a simulator will adopt the same HUD that has been designed for high performance aircraft, and attempts will be made to modify this HUD design to accommodate the simulator environment. Thus the optics can be somewhat modified and a cathode ray tube (CRT) image source can be repositioned. Usually to reduce any retooling costs and design costs, the basic structure of the aircraft HUD and its optical and mechanical design philosophy will generally be carried forward in the simulator environment.

Examples of HUDs can be found in U.S. Pat. No. 3,915,548, U.S. Pat. No. 3,940,204, and U.S. Pat. No. 3,549,803.

The prior art is still seeking to provide a low-cost simulator HUD that can simulate the high performance of an aircraft HUD while maintaining the focus of the imagery near or on the surface of the scenery as represented by a dome or very close rear projection screen.

OBJECTS AND SUMMARY OF THE INVENTION

The present invention provides a wide FOV simulator HUD for providing images to a viewer along an optical axis. A first image source for the HUD such as a cathode ray tube (CRT) having a phosphors design wavelength in the green optical spectrum such as at either 525 nm or 545 nm can be utilized to create first images such as instrument information. A second image source such as an out-the-window projection screen realizes a simulated environmental scene with three CRT projectors in the red, green, and blue wavebands. The green CRT projector is selected to have a design wavelength slightly shifted from the wavelength of the HUD CRT. Thus, for example, a P43 CRT or a P53 CRT projector can be selected with a design wavelength of 545 nm, as compared with a P1 CRT design wavelength of 525 nm for the HUD CRT. The HUD CRT could alternatively have a design wavelength of 545 nm as long as the green CRT projector is selected from a different design wavelength.

A holographic combiner is orientated on the optical axis with its center of curvature on the optical axis so that it directly faces the viewer. The distance between the virtual image which is realized by the CRT HUD and the holographic combiner is less than two times the focal length of the holographic combiner. The curved holographic combiner has a transparent substrate with a reflective hologram on a convex side and an antireflective coating on the concave side. The reflective hologram is further coated with a thin urethane protective coating which secondarily assists in eliminating any ghost images from the second image source by overlaying and masking any ghost image reflection from the rear surface with the image from the main holographic reflection.

A beamsplitter is positioned on the optical axis and forms an acute angle with the optical axis and is tilted so that an upper edge of the beamsplitter is further away from the viewer than a lower edge.

A relay optical system comprising three lens units of a relatively low index of refraction inexpensive glass lens elements is used for directing the image from the HUD image source to the beamsplitter for reflection to the holographic combiner to provide a virtual image of the HUD image source. The holographic combiner includes a highly reflective hologram with a characteristic of reflecting a greater amount of energy, e.g., 90% at the design peak wavelength and at least 30% to 40% of the total energy of the HUD CRT image than the corresponding design wavelength of the projector screen CRT, which can transmit 90% of this energy through the holographic combiner. The holographic combiner is a portion of a spherical surface having a focal length of nine inches in the specific embodiment set forth herein.

The optical design of the simulator HUD takes advantage of the less stringent environment of a simulator where a relatively low brightness will be experienced and the problems of visible reflections of the sky off the combining elements are eliminated. Additionally, there are no extreme structural requirements since issues of shattering or breaking of the combining elements and operation under the extreme environment of the aircraft world are not relevant. Thus, the overall brightness of the simulator HUD need only be in the range of 50–100-foot Lamberts.

The resulting simulator HUD provides a comparable 30-degree-wide FOV focused at an out-of-window scene that need only be 40 inches away from the pilot/viewer. The HUD is actually designed to accommodate the focal length so that the FOV is actually 33.3 degrees to accommodate the 2½-inch eye separation distance.

The relay optical system includes three lens units, the first lens unit including a field lens adjacent the HUD CRT and the third lens unit including a meniscus lens, the meniscus lens being concave towards the virtual image side of the optical axis and providing the function of correcting spherical aberration and coma. The lens elements selected are relatively inexpensive and do not require aspherical surfaces or expensive glass material. Likewise, the holographic combiner takes advantage of commercially available holographic material and utilizes only a single thin glass shell, as opposed to the two concentric spherical glass substrate shells that are required in the high reflective efficiency of a flightworthy HUD system.

Finally, the beamsplitter, when tilted away from the pilot/viewer, would be an unacceptable design for a flightworthy HUD, since reflection from the sky and sun above the HUD would reflect directly off of the beamsplitter into a pilot's eyes to degrade the virtual image contrast or hinder the vision of the pilot. However, our beamsplitter can be positioned at a 52.5-degree tilt to the optical axis, with the tilt away from the viewer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Figures 1, 2:
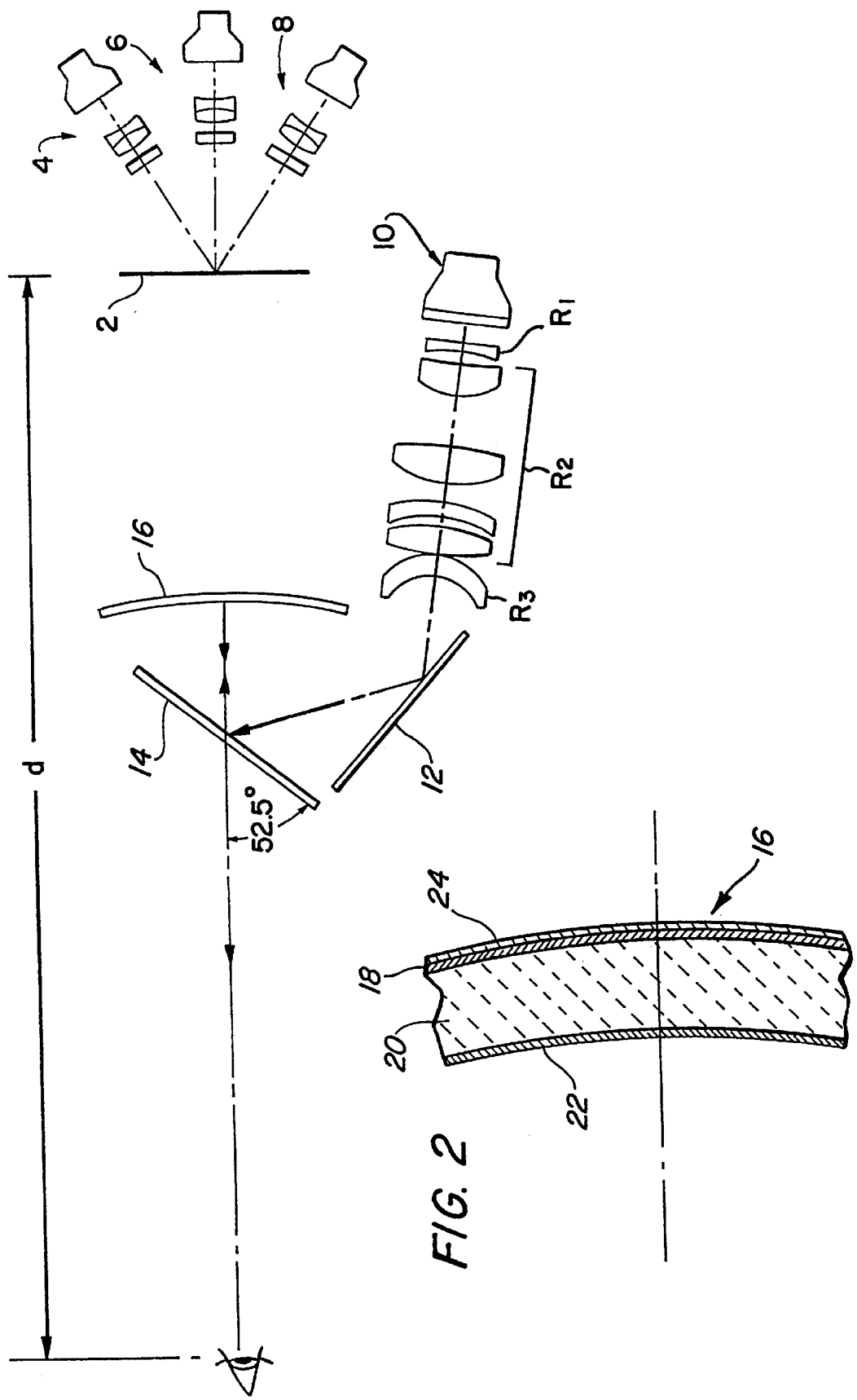
FIG. 1 is a schematic view of the present invention.
FIG. 2 is a cross-sectional view of the holographic combiner.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a wide field-of-view simulator heads-up display with a selective holographic combiner.

When flightworthy HUD systems have been used in simulator domes, it was usually required that they be refocused from their design "infinity viewing distance" to 20 feet for the large domes. Generally this is accomplished by moving the image source closer to the imaging optics to reduce focus distance.

Usually, as a virtual imaging system is focused inside of infinity, with the imaging source being closer to the imaging lens system, the virtual image would generally be expected to improve and be more stable. Thus, intuitively, it would seem that when a standard HUD system that has been designed for an aircraft is refocused, the image would be expected to look slightly better when focused inside of infinity.

The present inventors found that refocusing an "infinity focusing HUD" to a mere 40 inches did not improve the image quality. In fact, when focusing closer than the typical 20-foot dome radius, the HUD aberrations that were experienced, particularly astigmatism and coma, actually began to increase to an unacceptable level. To address this problem, the present inventors developed a unique set of relay optics for a simulator environment, along with a different approach to providing both a beamsplitter and a curved holographic combiner on the optical axis for correlation with a rear projection screen for providing outside imagery.

Referring to FIG. 1, the optical design of the present invention was intentionally developed to take advantage of the less stringent environment of a simulator compared to a flightworthy HUD system. In this regard, the advantages of designing for low brightness, without being concerned about any visible reflections of the sky or of any extreme structural requirements, permit the optical components to be optimized specifically for an economic simulator HUD. A direct view optical system is provided that can still simulate the high performance of an aircraft HUD but can keep the focus of the imagery near or on the surface of the projection screen or "out-of-window" scenery. As shown in FIG. 1, a very close rear projection screen is utilized to provide the background scenery. It should be realized that the scenery can just as easily be presented on a dome configuration.

Referring to FIG. 1, a projection screen 2 can be used to realize the out-of-window scenery resulting from the combined images of a red CRT projection unit 4, a green CRT projection unit 6, and a blue CRT projection unit 8. Each of these projection units will have its own spectral characteristics. The image source for the HUD simulator can be a three-inch CRT 10 whose spectral characteristics are specifically designed in correlation with the CRT projection units of the projection screen. For example, assuming that the display information to be presented by the HUD CRT 10 will be green, then the CRT phosphor should be selected to be distinguishable from the green rear projection unit 6. For example, the CRT phosphor of the HUD unit 10 can be either a narrow band green P1 (525 nm) or P43/P53 (545 nm), whichever is not being used by the green projection unit 6. In this embodiment, it is presumed that the CRT phosphor will be a P1 525 nm for the HUD projection unit 10. The green projection unit 6 will use a P53 phosphor with a design wavelength of 545 nm.

Our present design will permit a FOV and exit pupil size that can mimic the requirements found in a high performance HUD such as a Lantrin HUD used on the F16 aircraft with an FOV of 30 degrees and an exit pupil size of 5 inches. To achieve this performance while maintaining the use of off-the-shelf optical technology and components, the present invention provides a relay optical system consisting of three lens units, with the first lens unit $R_1$ being a field lens to correct both field curvature and astigmatism. To maintain the cost considerations, the lens elements selected have power surfaces of a conventional spherical configuration, and relatively inexpensive crown glasses, such as a Schott BK7, are selected. The second lens unit $R_2$ is basically the power unit and provides the main optical power of the relay lens system and comprises four lenses. The final lens $R_3$ is a highly curved meniscus lens bent toward the intermediate image plane to correct spherical aberration and coma. If desired, a filter can be located immediately after the lens unit $R_3$.

An enhanced aluminum fold mirror 12 reflects the image source to a 30R/70T commercial grade beamsplitter 14. As can be appreciated, the fold mirror 12 renders the design more compact, but can be eliminated. The beamsplitter is approximately ⅛-inch in thickness and, as can be seen, is tilted on the optical axis to form an acute angle with the optical axis in a direction away from the viewer/pilot of 52½ degrees. This design is based on the premise that the exit pupil will be at a distance, d, of 40.34 inches from the rear projection screen 2. Thus, any HUD imagery from the HUD CRT 10 is focused by the on-axis relay optics at a preferred secondary object plane of a curved holographic combiner 16. The fold mirror 12 directs the image light up to the beamsplitter 14, which will reflect a relatively small portion of the relayed image light onto the holographic combiner 16. The beamsplitter 16 is purposely made as an inefficient reflector to keep the see-through transmission high, since the overall brightness of the simulator HUD need only be 50–100-foot Lambert. Since the simulator has only a front out-of-window image scene on the projection screen 2 and nothing above or behind the user, the beamsplitter stray reflections of the darkened ceiling and wall behind the user will not overshadow either the HUD images from the CRT 10 or the out-of-window imagery. The viewer will observe both the images realized on the rear projection screen 2 and the HUD CRT images reflected by the holographic combiner 16 as they are viewed through the beamsplitter 14.

The holographic combiner 16 uses a conformal hologram to provide efficiency without introducing any flair or dispersion. The holographic combiner 16 is relatively thin to eliminate see-through errors and to take advantage of the fact that no structural strength requirements equivalent to those of a flightworthy HUD are necessary. Thus the curved holographic combiner 16 can be formed from a single thin piece of a slumped and postpolished glass plate (that is, a thin glass plate that is heated and conformed about a spherical surface) with a volume hologram provided. Photopolymer technology, for example, provided by DuPont can be used for the volume hologram at a relatively low cost to achieve a narrow, green reflector.

Referring to FIG. 2, a cross-sectional configuration of the holographic combiner 16 is disclosed. In military and other flightworthy HUD systems that take advantage of the high reflective efficiency of a holographic combiner, the hologram is generally placed between two concentric spherical glass substrate shells to provide optical power for a wide FOV and for protection of the fragile hologram layer. To maintain the cost constraints of the present design, an efficient hologram is desirable, but the cost of using two glass shells is not acceptable. Therefore, the present invention takes advantage of very recent commercial grade holographic materials so that the HUD holographic combiner 16 can be made from a single glass shell with the hologram 18 placed on the outside convex face of the glass shell 20. The holographic material can be spin-coated on the convex side; that is, letting the liquid run down the sides of the curved substrate. An antireflection coating 22 designed to meet the predetermined design wavelength of the HUD CRT 10 can be applied to the inside concave surface of the glass shell 20. A thin urethane overcoat 24 can be applied on the convex hologram 18 so that its intrinsic thickness helps overlay, and thereby mask, any ghost image reflection from the rear surface with an image from the main holographic reflection.

The focal length of the spherical holographic combiner 16 is nine inches, and the antireflection coating is of a grade V such as found in a Melles Griot catalog on coating. The holographic combiner 16 has its center of radius located on the optical axis. The virtual image distance of the HUD CRT imagery (that is, the distance between the virtual image and the holographic combiner 16) is less than two times the focal length of the combiner.

The following table presents dimensions in inches and gives an example of one embodiment of the present invention:

TABLE 1

DESCRIPTION OF OPTICAL ELEMENTS
(Dimensions are in inches.)

| Surface Number | Element Name | Radius of Curvature | Thickness to Next Surf | Glass Type | Clear Aperture |
|---|---|---|---|---|---|
| 1 | Design Eye | NA | 25.782 | AIR | |
| 2 | Combiner Inner | 17.912 | 0.188 | Schott B270 or equivalent | |
| 3 | Combiner Outer (Hologram) | 18.1 | −0.188 | Schott B270 or equivalent | 12.00 φ (Cropped to 8.0 vertical) |
| 4 | Combiner Inner | 17.912 | 4.611 | AIR | |
| 5 | Beamsplitter (0.125" nominal thickness) tilted 37.5° | Flat | 6.894 | Schott B270 or equivalent | 8.80 × 11.18 (Cut to proper shape) |
| 6 | Fold Mirror (nominal thickness) tilted 56.25° | Flat | 2.460 | Glass | 7.08 × 5.00 (Cut to proper shape) |
| 7 | Filter | Flat | 0.120 | | |
| 8 | | Flat | 1.000 | | |
| 9 | Element 1 | −1.718 | 0.704 | 517642 (BK7) | 3.040 φ |
| 10 | | −2.057 | 0.048 | AIR | 3.520 φ |
| 11 | Element 2 | 11.641 | 0.901 | 713538 (LAK8) | 3.520 φ |
| 12 | | −5.973 | 0.363 | AIR | 3.520 φ |
| 13 | Element 3 | −3.590 | 0.500 | 728284 (SF10) | 3.480 φ |
| 14 | | −5.165 | 0.647 | AIR | 3.680 φ |
| 15 | Element 4 | 4.187 | 1.200 | 517642 (BK7) | 3.720 φ |
| 16 | | −27.239 | 1.837 | AIR | 3.500 φ |
| 17 | Element 5 | 2.784 | 1.118 | 517642 (BK7) | 2.660 φ |
| 18 | | 26.647 | 0.385 | AIR | 2.440 φ |
| 19 | Element 6 | −3.902 | 0.300 | 620357 (F1) | 2.500 φ |
| 20 | | 176.56 | 0.639 | AIR | 2.780 φ |
| 21 | CRT Faceplate | Flat | 0.207 | Glass | 3.000 φ |
| 22 | Image Plane | Flat | | | 3.000 φ |

The simulator HUD set forth in the above table provides both a comparable 30-degree wide FOV focused on out-of-window scene only 40 inches from the pilot/viewer. Since we are focusing at 40 inches, the apparent F30-degree FOV is actually provided in our simulator HUD by providing 33.3 degrees FOV (due to the 2.5-inch eye separation). Thus, our simulator HUD design achieves an FOV 10% greater then any FOV of any currently flying HUD as a result of the use of our unique beamsplitter and curved holographic combiner approach. The volume hologram 18 on our holographic combiner 16 specifically matches the design wavelength of 525 nm for our HUD CRT 10. Thus a relatively high reflectivity of 90% is achieved at the design peak wavelength of the HUD CRT 10 while transmitting fully 90% of the 545 nm design wavelength green of the green projection unit 6. This is achieved even though the design peaks of our wavelengths are only 20 nm apart. The virtual image created by the curved reflector of the holographic combiner 16 is viewed through the beamsplitter 14 from the exit pupil. The overall optical system is accordingly optimized to provide accuracy in binocular performance across the exit pupil and FOV at the prime focus of only 40 inches (one full diopter from the typical aircraft HUD focus).

While the above invention discloses the optical choices made by the present inventors, it is clear that variations of these design choices could be made while still practicing the parameters of the present invention. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A wide FOV simulator heads-up display for providing images to a user along an optical axis, comprising:
    a first image source, including first images of a predetermined design wavelength;
    a second image source, including second images which do not contain the predetermined design wavelength;
    means for providing the second image source on the optical axis;
    a holographic combiner;
    a beamsplitter; and
    a relay optical system for directing the first image source after reflection from the beamsplitter to the holographic combiner to provide a virtual image of the first image source in combination with the second image on the optical axis.

2. The invention of claim 1 wherein the holographic combiner includes a hologram with a characteristic of reflecting a greater amount of energy at the predetermined design wavelength than at other wavelengths.

3. The invention of claim 1 wherein the second images include a color at a predetermined design wavelength which is different than the predetermined design wavelength of the first images.

4. The invention of claim 1 wherein the first image source is selected from one of a first cathode ray tube with a phosphor of 525 nm and a second cathode ray tube with a phosphor of 545 nm while the second image source uses the other cathode ray tube.

5. The invention of claim 1 wherein the holographic combiner is curved and the distance between the virtual image and the holographic combiner is less than two times the focal length of the holographic combiner.

6. The invention of claim 1 wherein the holographic combiner is curved with a transparent substrate and a reflective hologram on a convex side.

7. The invention of claim 6 wherein a concave side of the curved holographic combiner is coated with an antireflective coating.

8. The invention of claim 7 wherein the concave reflective hologram is coated with a urethane protective coating.

9. The invention of claim 1 wherein the holographic combiner is orientated on the optical axis with its center of curvature on the optical axis.

10. The invention of claim 1 wherein the beamsplitter is positioned on the optical axis and forms an acute angle with the optical axis and is tilted so that an upper edge is farther away from the user than a lower edge.

11. The invention of claim 1 wherein the relay optical system includes three lens units, the first lens unit including a meniscus lens with respective radii of curvature smaller than the radii of curvature of any other lens element in the relay optical system, the meniscus lens being concave towards the virtual image side of the optical axis.

12. A wide FOV simulator heads-up display for providing images to a user along an optical axis, comprising:
    an image source;
    a holographic combiner;
    a beamsplitter; and
    a relay optical system for directing the image source after reflection from the beamsplitter to the holographic combiner to provide a virtual image of the image source including three lens units and including a meniscus lens concave towards the virtual image side of the optical axis.

13. The invention of claim 12 wherein the holographic combiner is curved and the distance between the virtual image and the holographic combiner is less than two times the focal length of the holographic combiner.

14. A wide FOV simulator heads-up display providing images to a user along an optical axis, comprising:
    a first image source positioned off of the optical axis emitting light of a predetermined design wavelength;
    a second image source emitting light at a wavelength other than the predetermined design wavelength;
    a holographic combiner oriented on the optical axis with its center of curvature on the optical axis for transmitting a second image from the second image source to the user along the optical axis;
    a beamsplitter positioned on the optical axis and forming an acute angle with the optical axis and tilted so that an edge is disposed toward the user; and
    a relay optical system for directing a first image from the first image source to the beamsplitter to provide a virtual image of the first image to the user along the optical axis.

15. A wide FOV simulator heads-up display providing images to a user along an optical axis, comprising:
    a plurality of image sources, each directing light along an optical path, a curved holographic combiner including a transparent substrate having a urethane protective coating on a convex side and an antireflection coating on a concave side, the holographic combiner adapted to receive light from one of the plurality of image sources;
    a beamsplitter coupled with the holographic combiner and disposed along the optical axis; and
    a relay optical system for directing light from the image sources to the beamsplitter to provide a virtual image.

* * * * *